(12) United States Patent
Eberts (10) Patent No.: US 6,206,530 B1
(45) Date of Patent: Mar. 27, 2001

(54) COLLAPSIBLE FRAME

(75) Inventor: Allen F. Eberts, Batavia, IL (US)

(73) Assignee: The TonJon Company, Aurora, IL (US)

( * ) Notice: Subject to any disclaimer, the term of this patent is extended or adjusted under 35 U.S.C. 154(b) by 0 days.

(21) Appl. No.: 09/469,461

(22) Filed: Dec. 21, 1999

(51) Int. Cl.[7] .................................................. G02B 7/182
(52) U.S. Cl. ........................ 359/879; 359/880; 359/881; 359/882
(58) Field of Search .................................... 359/879, 880, 359/881, 882; 248/472, 473, 474, 477, 479

(56) References Cited

U.S. PATENT DOCUMENTS

| | | | |
|---|---|---|---|
| 14,503 | 3/1856 | Hubbell | 102/473 |
| 112,432 | 12/1938 | Bohn | D6/308 |
| 163,481 | 5/1951 | Rauh | D6/308 |
| 254,208 | 2/1980 | Breslow | D6/309 |
| 424,751 | 5/2000 | Kudo et al. | D26/78 |
| 425,313 | 5/2000 | Zadro | D6/309 |
| 433,708 | 8/1890 | Wiederer | 248/472 |
| 1,206,720 | 11/1916 | Lane | 248/472 |
| 1,216,979 | 2/1917 | Freed | 362/142 |
| 1,248,284 | 11/1917 | Dickenson | 132/291 |
| 1,507,117 | 9/1924 | Johnson | 132/304 |
| 1,541,451 | 6/1925 | Wallace | 132/296 |
| 1,583,120 | 5/1926 | Brenner | 132/296 |
| 2,770,387 | 11/1956 | Loween | 220/18 |
| 3,185,831 | 5/1965 | Ray et al. | 240/6.45 |
| 3,977,645 | * | 8/1976 | Deely | 248/479 |
| 4,119,107 | * | 10/1978 | Pinzone et al. | 132/79 G |
| 5,228,879 | * | 7/1993 | Fromm | 446/219 |
| 5,832,941 | 11/1998 | Murillo | 132/316 |

FOREIGN PATENT DOCUMENTS 14503 6/1912 (GB) .

* cited by examiner

Primary Examiner—Mohammad Y. Sikder
(74) Attorney, Agent, or Firm—Wallenstein & Wagner, Ltd.

(57) ABSTRACT

A frame (10) is disclosed having a top member (12) and a base member (14). A support member (16) having two ends (18, 20) is pivotally connected to the top member (12) at one end (18) and the base member (14) at the other end (20). The top member (12) and the base member (14) rotate about their respective pivot connections with the support member (16) to alternate the collapsible frame (10) between a closed position and an opened position.

17 Claims, 6 Drawing Sheets

COLLAPSIBLE FRAME

DESCRIPTION

Technical Field

The present invention generally relates to frames. More specifically, the present invention relates to a collapsible free-standing mirror for use on a horizontal surface.

BACKGROUND OF THE INVENTION

Collapsible mirrors have been in use for many years. The compact feature of the collapsible mirror is appealing to travelers having limited space for packing their belongings. Although compactness of the mirror may be one of the most desired features, other attractive qualities sought include: ease of use, appearance, durability, etc. Many such mirrors do not address most of these attributes; they are cumbersome and fragile. Additionally, the contents supported within the case may be exposed to damage as the mirror is packed and handled while traveling.

The present invention is directed to solving these and other problems by providing an elegant, yet durable, collapsible frame, with a mirror therein, that is very easy to use and transport.

SUMMARY OF THE INVENTION

The present invention is generally a collapsible frame, more specifically, a collapsible mirror. In the closed position, the mirror resembles clam shells. The components are folded together and protected. In the opened position, the base member can be positioned on a flat surface, such as a dresser, bureau, vanity, desk, counter, etc. and the mirror is supported at a workable height above the base member.

According to a first embodiment of the present invention, the collapsible, free-standing mirror has three primary components, namely a base member, a top member and a support member. The support member acts as a link between the base member and the top member and has pivots at each end thereof. The top member is pivotally connected by a first pivot connection to a first end of the support member. This top member has an inner surface and an opposed outer surface. Similarly, the base member is pivotally connected by a second pivot connection to a second end of the support member. This base member also has an inner surface and an opposed outer surface. The top member and the base member are adapted to rotate about their respective pivot connections with the support member about the support member. Each, namely the top member and the base member, rotate between an opened position and a closed position. In the opened position, the outer surface of the base member abuts the support member and the top member is supported above the base member; and in the closed position, the inner surface of the top member abuts the inner surface of the base member.

The mirror is supported by the inner surface of the top member. An additional aspect includes a light surrounding the mirror.

The top member and the base member are adapted to rotate about their respective pivot connections with the support member between an opened position and a closed position. The top member rotates at least 270° and the base member rotates at least 180°. In the opened position, the outer surface of the base member abuts the support member and the top member is supported above the base member. In the closed position, the inner surface of the top member abuts the inner surface of the base member. The top member further includes a channel cut into an edge thereof for receiving the first end of the support member and permitting limited rotation of the support member relative to the top member. The first pivot connection is a first pivot pin passing through the support member adjacent the first end through the channel and into the top member adjacent the edge thereof. The base member further has a notch cut into an edge thereof for receiving the second end of the support member and permits limited rotation of the support member relative to the base member. The second pivot connection is similar to the first pivot connection wherein the second pivot pin passes through the support member adjacent the second end through the notch and into the base member adjacent the edge thereof. The inner surface of the base member has a recess therein for receiving the support member when the base member is in the closed position.

A further aspect of the invention includes an offset in the support member near the first end thereof. The offset is approximately 45°, forming a first abutting surface adjacent the first end of the support member to cooperate and abut a receiving surface near the channel of the top member. The support member further includes a second abutting surface adjacent the second end of the support member to cooperate and abut a receiving surface near the notch of the base member. And the first pivot connection includes means for selectively holding the top member in one of several angles relative to the support member in the opened position.

Yet another further aspect of the present invention is directed to a self-supporting collapsible frame for use on a horizontal surface. The frame includes a housing having a base member and a top member. The base member has an inner surface, an outer surface, a receiving surface and an edge. The top member has an inner surface, an outer surface, a receiving surface and an edge. The top member is rotatably attached to a first end of a support member and the base member is rotatably attached to a second end of the support member. The support member has a first and a second abutting surface; the top member is selectively rotatable between a closed position and an opened position in which the first abutting surface of the support member prevents further rotation in a first direction by mating with the receiving surface of the top member in an opened position; the base member is selectively rotatable between a closed position and an opened position in which the second abutting surface of the support member prevents further rotation in a first direction by mating with the receiving surface of the base member in an opened position. It is further contemplated that the base member and the top member are releasably fastened together to enclose the support within the housing.

Other advantages and aspects of the present invention will become apparent upon reading the following description of the drawings and detailed description of the invention.

BRIEF DESCRIPTION OF THE DRAWINGS

In order that the present invention may be more fully understood, it will now be described by way of example, with reference to the accompanying drawings in which.

DETAILED DESCRIPTION OF THE PREFERRED EMBODIMENT

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figures 1, 2A, 2B:
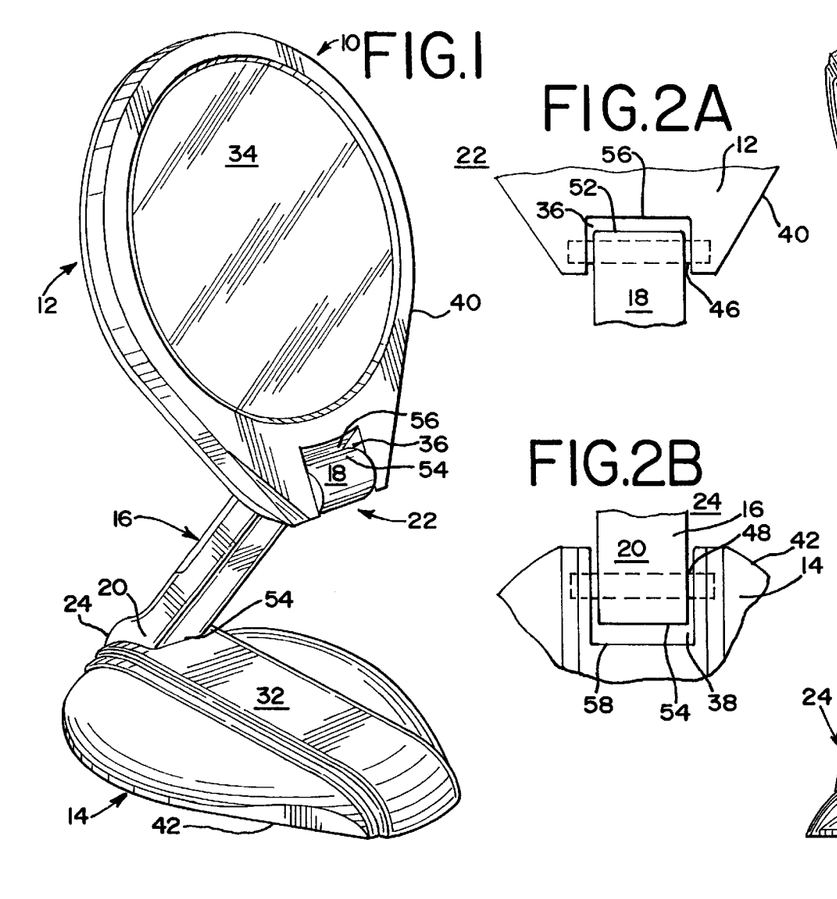
FIG. 1 is a perspective front view of a mirror shown in the opened, extended position; made in accordance with the teachings of the present invention.
FIG. 2A is an exploded view of the first pivot connection when the top member and the support member have rotated about each other approximately 180°.
FIG. 2B is an exploded view of the second pivot connection when the base member and support member have rotated about each other approximately 180°.
Figure 2:
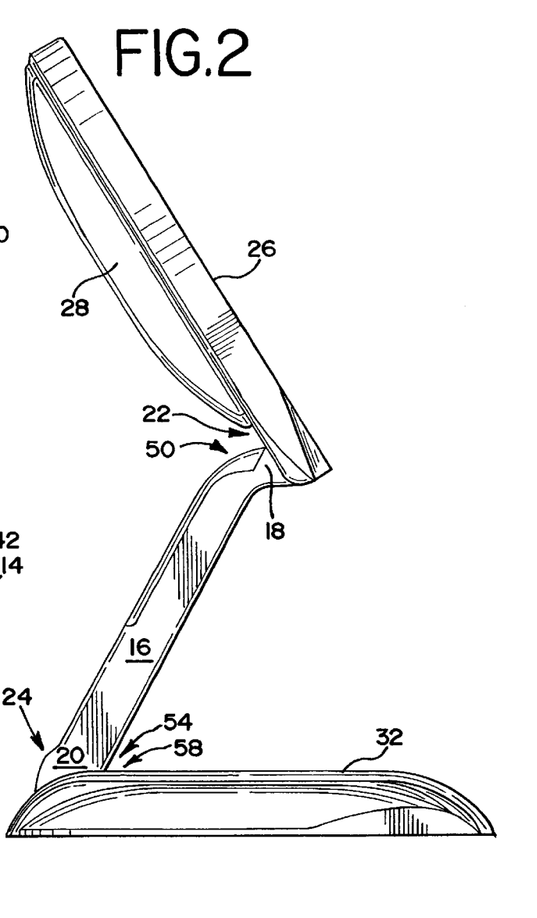
FIG. 2 is a side elevation view thereof in the opened, extended position.
Figure 3:
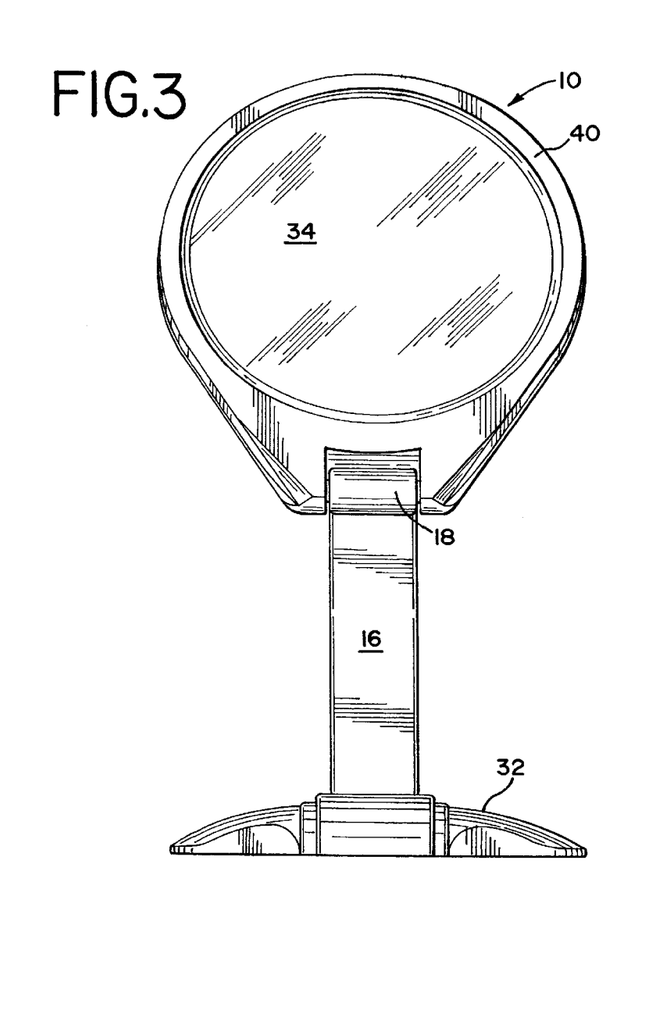
FIG. 3 is a front elevation view thereof in the opened, extended position.
Figure 4:
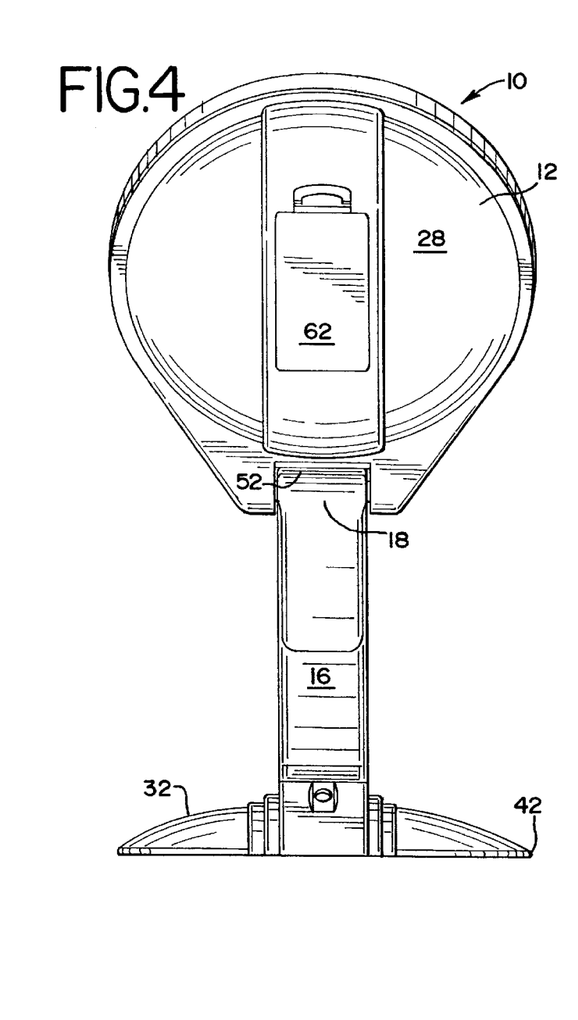
FIG. 4 is a rear elevation view thereof in the opened, extended position.
Figure 5:
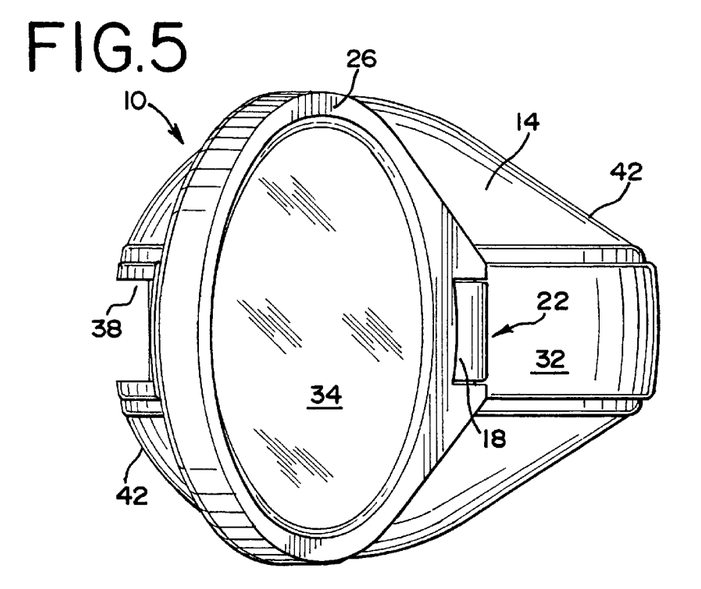
FIG. 5 is a top plan view thereof in the opened, extended position.
Figure 6:
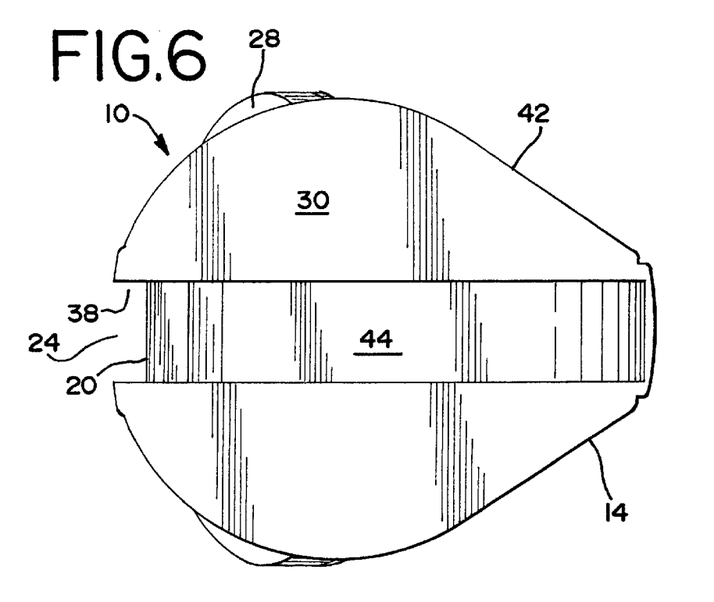
FIG. 6 is a bottom plan view thereof in the opened, extended position.

With reference to FIGS. 1 through 12, the collapsible frame 10, comprises a top member 12, a base member 14 and a support member 16. The support member 16 has two ends 18, 20 and functions as a link between the base member 14 and the top member 12. The top member 12 is pivotally connected by a first pivot connection 22 to the first end 18 of the support member 16. Similarly, the base member 14 is pivotally connected by a second pivot connection 24 to the second end 20 of the support member 16. The frame can be positioned between a closed position, (FIG. 7), and an opened position, (FIG. 1).

The top member 12 has an inner surface 26 and an opposing outer surface 28. The inner surface 26 of the top member 12 may support a mirror 34, light, photograph, etc., as shown in FIG. 1. The base member 14 also has both an inner surface 30 and an outer surface 32. The top member 12 and the base member 14 rotate about each's respective pivot connection 22, 24 (shown by the arrows in FIG. 2) with the support member 16, between the opened and closed positions. In the opened position, the outer surface 32 of the base member 14 abuts the support member 16 and the top member 12 is supported above the base member 14. In the closed position, the inner surface 26 of the top member 12 abuts the inner surface 30 of the base member 14. The range of the first pivot connection 22 is at least 180°. The range of the second pivot connection 24 is at least 270°. Preferably, the range of motion about the first pivot connection 22 between the top member 12 and the support member 16 is approximately 230° and the range of motion about the second pivot connection 24 between the base member 14 and the support member 16 is approximately 315°.

Figure 7:
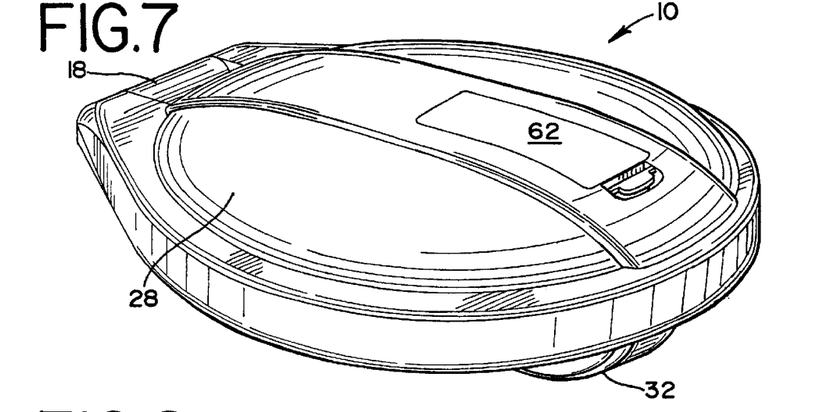
FIG. 7 is a perspective front view of the mirror in the closed, folded position.
Figure 8:
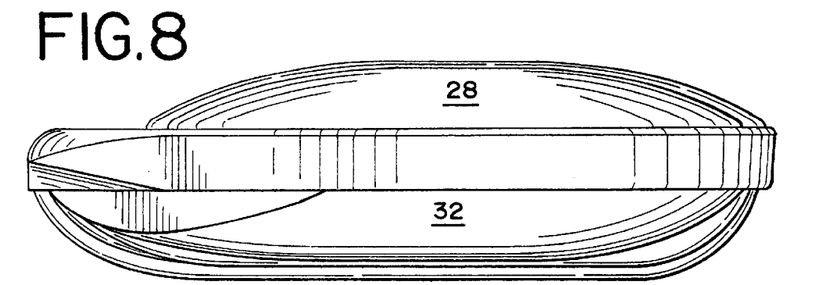
FIG. 8 is a side elevation view thereof in the closed, folded position.
Figure 9:
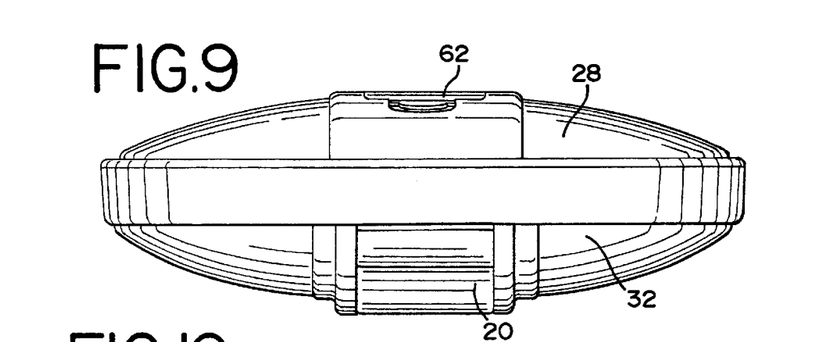
FIG. 9 is a front elevation view thereof in the closed, folded position.
Figure 10:
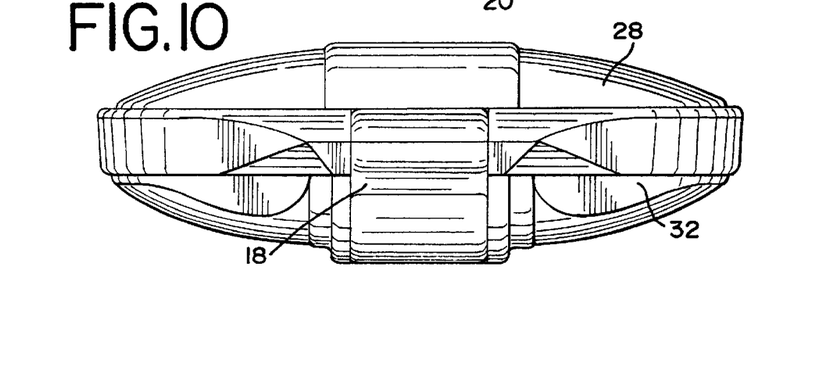
FIG. 10 is a rear elevation view thereof in the closed, folded position.
Figure 11:
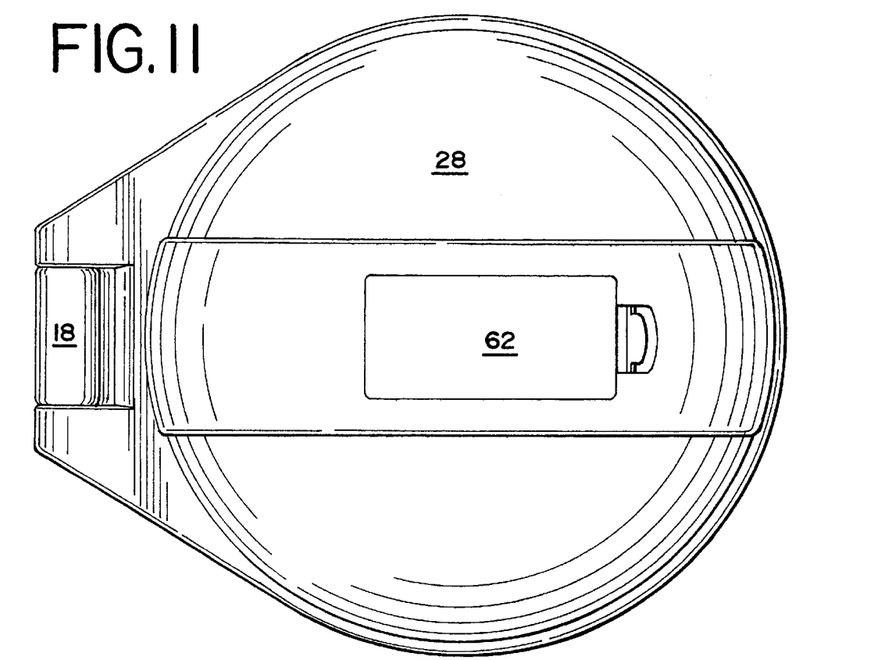
FIG. 11 is a top plan view thereof in the closed, folded position.
Figure 12:
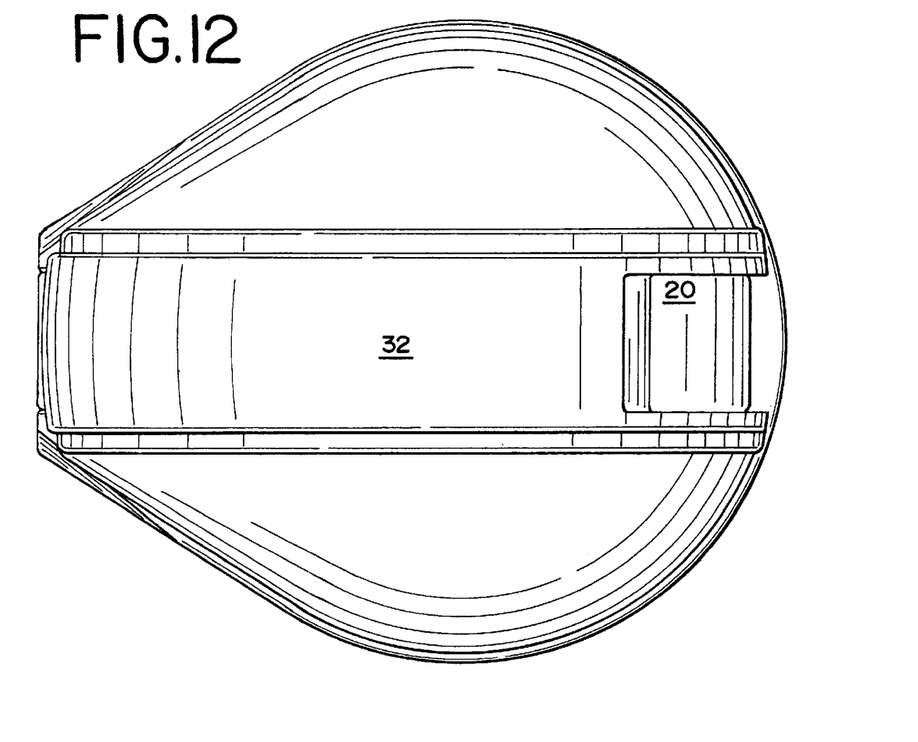
FIG. 12 is a bottom plan view thereof in the closed, folded position.

The collapsible frame has a support member 16, a top member 12 pivotally connected by a first pivot connection 22 to a first end 18 of the support member 16. The top member 16 has an inner surface 26 supporting a mirror 34 and an opposed outer surface 28. A base member 14 is pivotally connected by a second pivot connection 24 to a second end 20 of the support member 16. The base member 14 has an inner surface 30 and an opposed outer surface 32. Both the top member 12 and the base member 14 rotate about their respective pivot connections 22, 24 with the support member 16, between an opened position (FIG. 1) and a closed position (FIG. 7). The top member 12 rotates at least 180° and the base member 14 rotates at least 270°. In the opened position, the outer surface 32 of the base member 14 abuts the support member 16 and the top member 12 is supported above the base member 14. In the closed position, the inner surface 26 of the top member 12 abuts the inner surface 30 of the base member 14. The top member 12 further includes a channel 36 cut into an edge 40 of the top member for receiving the first end 18 of the support member 16 and permitting limited rotation of the support member 16 relative to the top member 12.

The first pivot connection 22 comprises a first pivot pin 46 passing through the support member 16 adjacent the first end 18 through the channel 36 and into the top member 12 adjacent the edge 40 thereof. The base member 14 further having a notch 38 cut into an edge 42 of the base member for receiving the second end 20 of the support member 16 and permitting limited rotation of the support member 16 relative to the base member 14. The second pivot connection 24 comprises a second pivot pin 48 passing through the support member 16 adjacent the second end 20 through the notch 38 and into the base member 14 adjacent the edge 42 thereof. The inner surface 30 of the base member 14 defines a recess 44 therein for receiving the support member 16 when the base member 14 is in the closed position.

An offset 50 (FIG. 2) is constructed into the support member 16 near the first end 18 thereof. The offset 50 is approximately 45°, forming a first abutting surface 52 adjacent the first end 18 of the support member 16 to cooperate contact a top receiving surface 56 near the channel 36 of the top member 12. A second abutting surface 54 adjacent the second end 20 of the support member 16 cooperates and contacts a base receiving surface 58 near the notch 38 of the base member 14. The first pivot connection 22 includes means for selectively holding the top member 12 in one of several angles relative to the support member 16 in the opened position.

The frame 10 comprises a housing having a top member 12 and a base member 14. The top member 12 has an inner surface 26, an outer surface 28, a receiving surface 56 and an edge 40. The base member 14 has an inner surface 30, an outer surface 32, a receiving surface 58 and an edge 42. The top member 12 is rotatably attached to a first end 18 of the support member 16 and the base member 14 is rotatably attached to a second end 20 of a support member 16. The support member 16 has a first 52 and a second 54 abutting surface, wherein the top member 12 is selectively rotatable between a closed position and an opened position in which the first abutting surface 52 of the support member 16 prevents further rotation in a first direction by mating with the receiving surface 56 of the top member 12 in an opened position, and wherein the base member 14 is selectively rotatable between a closed position and an opened position in which the second abutting surface 54 of the support member 16 prevents further rotation in a first direction by mating with the receiving surface 58 of the base member 14 in an opened position.

Figure 13:
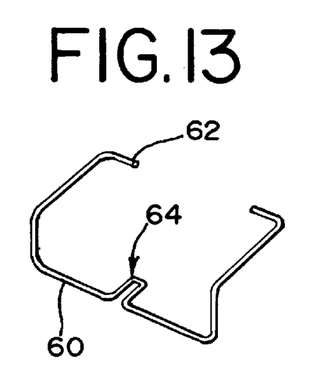
FIG. 13 is a perspective view of one embodiment of the releasable fastener.
Figure 14:
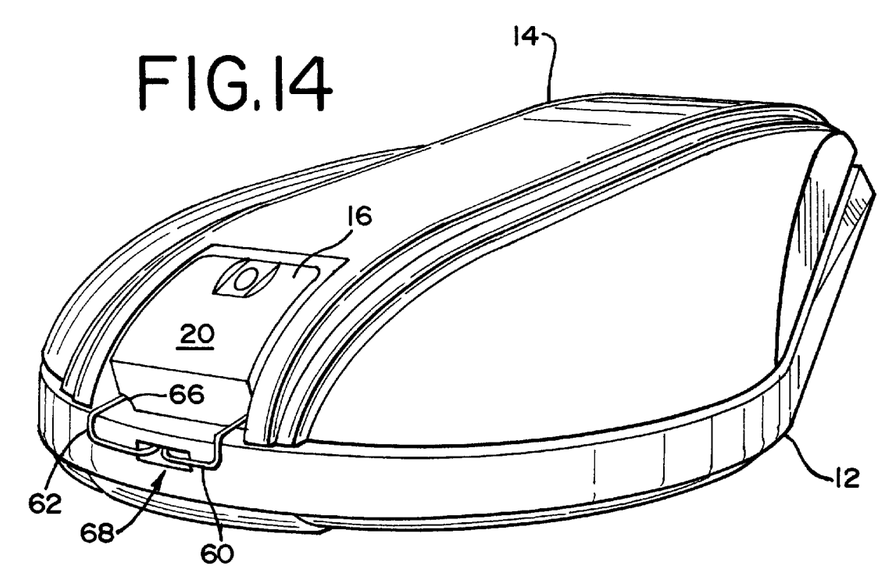
FIG. 14 is a perspective view of the collapsible frame releasably fastened in the closed position by the releasable fastener shown in FIG. 13; and, FIG. 15 is a fragmentary side view of the collapsible frame shown in FIG. 14 with the slot 68 and openings 66 shown in phantom.
Figure 15:
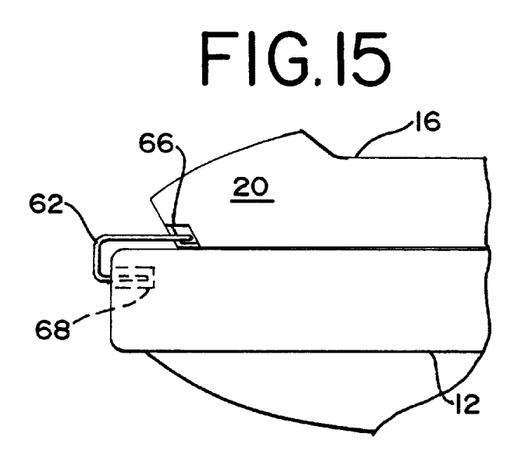

In the closed position, the base member 14 and the top member 12 are releasably fastened together to enclose the support 16 within the housing. FIG. 13. The releasable fastener 60 is attached to the support member 16 and may include a latch, snap, press fitting, hook and fastener, button, friction fit, clasp, magnets, strap, belt, zipper, suction cup or any other releasable fastener commonly known by one of ordinary skill in the art. FIG. 13 illustrates one such embodiment of the releasable fastener 60. A wire 62 having a notch 64 is adapted to the support member 16 through the openings 66. When the frame 10 is in the closed position, the notch 64 cooperates with the slot 68 to hold the top member 12, base member 14 and support member 16 together.

An energy source is preferably located within the support member 16, near the storage panel 62, although the energy source may also be located within the top 12 or base 14 members. The energy source may be a DC battery, an AC outlet or a solar panel. An accessories compartment can also be located in the base 14, top 12 or support 16 members.

While the specific embodiments have been illustrated and described, numerous modifications come to mind without significantly departing from the spirit of the invention and the scope of protection is only limited by the scope of the accompanying claims.

What is claimed is:

1. A free-standing frame for use on a surface comprising:
   a support member;
   a top member pivotally connected by a first pivot connection about a first end of the support member and having an inner surface and an opposed outer surface; and,
   a base member pivotally connected by a second pivot connection about a second end of the support member and having an inner surface and an opposed outer surface,
      both the top member and the base member to rotate about their respective pivot connections with the support member between an opened position and a closed position, such that in the opened position, the outer surface of the base member abutting the support member and the top member being supported above the base member, and in the closed position, the inner surface of the top member abutting the inner surface of the base member with the support member disposed therebetween.

2. The frame as defined in claim 1 wherein the inner surface of the top member supports a mirror.

3. The frame as defined in claim 1 wherein the inner surface of the top member supports a mirror and a light around the perimeter of the mirror.

4. The frame as defined in claim 1 wherein the base member rotates about the second pivot connection at least 270° between the opened position and the closed position about the support member.

5. The frame as defined in claim 1 wherein the top member rotates about the first pivot connection at least 180° between the opened position and the closed position about the support member.

6. The frame as defined in claim 1 wherein the base member rotates about the second pivot connection approximately 315° between the opened position and the closed position about the support member and the top member rotates about the first pivot connection approximately 230° between the opened position and the closed position about the support member.

7. The frame as defined in claim 1 wherein the top member has a channel cut into an edge thereof for receiving the first end of the support member and permitting limited rotation of the support member relative to the top member and the first pivot connection is a first pivot pin passing through the support member adjacent the first end through the channel and into the top member adjacent the edge thereof.

8. The frame as defined in claim 1 wherein the base member has a notch cut into an edge thereof for receiving the second end of the support member and permitting limited rotation of the support member relative to the base member and the second pivot connection is a second pivot pin passing through the support member adjacent the second end through the notch and into the base member adjacent the edge thereof.

9. The frame as defined in claim 1 wherein the inner surface of the base member has a recess therein for receiving the support member when the base member is in the closed position.

10. The frame as defined in claim 1 wherein the first pivot connection includes means for selectively holding the top member in one of several angles relative to the support member in the opened position.

11. The frame as defined in claim 7 further including an offset in the support member near the first end thereof.

12. The frame as defined in claim 11 wherein the offset is approximately 45° forming an first abutting surface adjacent the first end of the support member to cooperate and abut a receiving surface within the channel of the top member.

13. The frame as defined in claim 8 further including a second abutting surface adjacent the second end of the support member to cooperate and abut a receiving surface within the notch of the base member.

14. A free-standing frame for use on a surface comprising:
    a support member;
    a top member pivotally connected by a first pivot connection about a first end of the support member and having an inner surface and an opposed outer surface; and,
    a base member pivotally connected by a second pivot connection about a second end of the support member and having an inner surface and an opposed outer surface,
       both the top member and the base member being adapted to rotate about their respective pivot connections with the support member between an opened position and a closed position, the top member rotating at least 180° and the base member rotating at least 270°,
       in the opened position, the outer surface of the base member abutting the support member and the top member being supported above the base member, and
       in the closed position, the inner surface of the top member abutting the inner surface of the base member,
       the top member further having a channel along an edge thereof for receiving the first end of the support member and permitting limited rotation of the support member relative to the top member and the first pivot connection being a first pivot pin passing through the support member adjacent the first end through the channel and into the top member adjacent the edge thereof, the base member further having a notch along an edge thereof for receiving the second end of the support member and permitting limited rotation of the support member relative to the base member and the second pivot connection is a second pivot pin passing through the support member adjacent the second end through the notch and into the base member adjacent the edge thereof, the inner surface of the base member having a recess therein for receiving the support member when the base member is in the closed position.

15. The frame as defined in claim 14 wherein the base member rotates about the second pivot connection approximately 315° between the opened position and the closed position about the support member and the top member rotates about the first pivot connection approximately 230° between the opened position and the closed position about the support member.

16. The frame as defined in claim 14 further including an offset in the support member near the first end thereof and the offset is approximately 45° forming an first abutting surface adjacent the first end of the support member to cooperate and abut a receiving surface near the channel of the top member and further including a second abutting surface adjacent the second end of the support member to cooperate and abut a receiving surface near the notch of the base member.

17. The frame as defined in claim 14 wherein the first pivot connection includes means for selectively holding the top member in one of several angles relative to the support member in the opened position.

* * * * *